US011025560B2

(12) United States Patent
Singleton, IV et al.

(10) Patent No.: US 11,025,560 B2
(45) Date of Patent: Jun. 1, 2021

(54) METHOD AND SYSTEM FOR SHARING USER CONFIGURATION DATA BETWEEN DIFFERENT COMPUTING SESSIONS

(71) Applicant: Citrix Systems, Inc., Fort Lauderdale, FL (US)

(72) Inventors: Leo C. Singleton, IV, Fort Lauderdale, FL (US); Ricardo Feijoo, Fort Lauderdale, FL (US); Avijit Gahtori, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 184 days.

(21) Appl. No.: 16/404,007

(22) Filed: May 6, 2019

(65) Prior Publication Data

US 2020/0358714 A1 Nov. 12, 2020

(51) Int. Cl.
*H04L 12/911* (2013.01)
*G06F 9/455* (2018.01)
*H04L 29/08* (2006.01)
*H04L 9/32* (2006.01)

(52) U.S. Cl.
CPC ........ *H04L 47/781* (2013.01); *G06F 9/45558* (2013.01); *H04L 9/3213* (2013.01); *H04L 67/141* (2013.01); *G06F 2009/45583* (2013.01); *G06F 2009/45595* (2013.01)

(58) Field of Classification Search
CPC ... H04L 47/781; H04L 9/3213; H04L 67/141; H04L 47/787; G06F 9/45558; G06F 2009/45583; G06F 2009/45595; G06F 2209/5011; G06F 9/5077; G06F 9/452
See application file for complete search history.

(56) References Cited

U.S. PATENT DOCUMENTS

2009/0106347 A1* 4/2009 Harwood ............. G06F 9/5055 709/203
2018/0054420 A1* 2/2018 Mindte ................ H04L 63/068

* cited by examiner

*Primary Examiner* — Soe Hlaing
(74) *Attorney, Agent, or Firm* — Daly, Crowley, Mofford & Durkee, LLP

(57) ABSTRACT

A method includes receiving a request from a client device to establish a first computing session for a first resource hosted on a virtual machine (VM). The method includes generating a session transfer key for accessing a second resource provided by a second resource provider. The method includes issuing instructions, to the VM that hosts the first resource, for establishing a second computing session to host the second resource, wherein the instructions include a mapping of the session transfer key to a session identifier. The method includes providing the instructions to the client device to establish the second computing session for the second resource without input for the second resource from the user of the client device. The establishment of the second computing session being between the VM and the second resource provider and based on the mapping of the session transfer key to the session identifier.

20 Claims, 11 Drawing Sheets

METHOD AND SYSTEM FOR SHARING USER CONFIGURATION DATA BETWEEN DIFFERENT COMPUTING SESSIONS

BACKGROUND

Cloud computing architectures enable ubiquitous, convenient, on-demand network access to a shared pool of configurable computing resources that can be rapidly provisioned and released with minimal management effort or service provider interaction. Cloud computing models can use a management platform that allows organizations to deploy cloud-hosted desktops and application software ("apps") to end users.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In one aspect, a method comprises receiving, by a server, a request from a client device to establish a first computing session for a first resource. The first computing session can host the first resource on at least one virtual machine (VM). In embodiments, the first resource is associated with a user of the client device and provided by a first resource provider. The method also includes generating, by the server, a session transfer key for accessing a second resource provided by a second resource provider. The second resource can be associated with the user of the client device. The second resource provider can be different than the first resource provider. Further, the method includes issuing, by the server, instructions, to the at least one VM that hosts the first resource, for establishing a second computing session to host the second resource. The instructions can include including a mapping of the session transfer key to a session identifier. Additionally, the method includes providing, by the server, the instructions to the client device to establish the second computing session for the second resource without input for the second resource from the user of the client device. Establishment of the second computing session being between the at least one VM and the second resource provider and can be based on the mapping of the session transfer key to the session identifier.

In embodiments, the method can include generating the session transfer key includes determining, by the server, the second resource for the client device. Determining the second resource for the client device includes querying, by the server, an authentication server for resources the user of the client device is authorized to access.

In some embodiments, generating the session transfer key includes obtaining, by the server, an authentication token from an authentication server, wherein the authentication token authenticates access of the user of the client device to the second resource; retrieving, by the server, configuration data from the second resource provider, wherein the configuration data includes information for establishing the second computing session; and encapsulating, by the server, the authentication token and the configuration data in the session transfer key. The configuration data can include information for interfacing with a resource provider associated with the second resource.

In other embodiments, the method can include generating, by the server, an independent computing architecture (ICA) file for transmitting the instructions to the client device for establishing the second computing session from the at least one VM, wherein the client device uses the ICA file to establish the first computing session. The method can also include embedding, by the server, the session transfer key within the ICA file such that the at least one VM is provided with the session transfer key in response to the first computing session being established. The ICA file can include an address and port of the at least one VM. The session transfer key can authenticate access to the second resource by the user.

In another aspect, a server comprises a memory and one or more processors coupled to the memory. The one or more processors are configured to receive a request from a client device to establish a first computing session for a first resource, wherein the first computing session hosts the first resource on at least one virtual machine (VM), and the first resource is associated with a user of the client device and provided by a first resource provider; generate a session transfer key for accessing a second resource provided by a second resource provider, the second resource associated with the user of the client device, wherein the second resource provider is different than the first resource provider; issue instructions, to the at least one VM that hosts the first resource, for establishing a second computing session to host the second resource, the instructions including a mapping of the session transfer key to a session identifier; and provide the instructions to the client device to establish the second computing session for the second resource without input from the user of the client device for the second resource, the establishment of the second computing session being between the at least one VM and the second resource provider and based on the mapping of the session transfer key to the session identifier.

In embodiments, the one or more processors can be further configured to generate the session transfer key by determining a second resource for the client device.

In some embodiments, the one or more processors can be further configured to determine the second resource by querying an authentication server for resources the user of the client device is authorized to access.

In other embodiments, the one or more processors can be further configured to generate the session transfer key by: obtaining an authentication token from an authentication server, wherein the authentication token authenticates access of the user of the client device to the second resource; retrieving configuration data from the second resource provider, wherein the configuration data includes information for establishing the second computing session; and encapsulating the authentication token and the configuration data in the session transfer key. The configuration data can include information for interfacing with a resource provider associated with the second resource.

In additional embodiments, the one or more processors can be further configured to generate an independent computing architecture (ICA) file for transmitting the instructions to the client device for establishing the second computing session from the at least one VM, wherein the client device uses the ICA file to establish the first computing session.

In further embodiments, the one or more processors can be further configured to embed the session transfer key within the ICA file such that the at least one VM is provided with the session transfer key in response to the first computing session being established. The ICA file can include an address and port of the at least one VM. The session transfer key can be configured to authenticate access to the second resource by the user.

In yet another aspect, a non-transitory computer-readable medium comprising computer-executable instructions, which when executed by one or more processors, cause the one or more processors to: receive a request from a client device to establish a first computing session for a first resource, wherein the first computing session hosts the first resource on at least one virtual machine (VM), and the first resource is associated with a user of the client device and provided by a first resource provider; generate a session transfer key for accessing a second resource provided by a second resource provider, the second resource associated with the user of the client device, wherein the second resource provider is different than the first resource provider; issue instructions, to the at least one VM that hosts the first resource, for establishing a second computing session to host the second resource, the instructions including a mapping of the session transfer key to a session identifier; and provide the instructions to the client device to establish the second computing session for the second resource without input from the user of the client device for the second resource, the establishment of the second computing session being between the at least one VM and the second resource provider and based on the mapping of the session transfer key to the session identifier.

In embodiments, the non-transitory computer-readable medium further comprising computer-executable instructions that, when executed, cause the one or more processors to generate the session transfer key by: obtaining an authentication token from an authentication server, wherein the authentication token authenticates access of the user of the client device to the second resource; retrieving configuration data from the second resource provider, wherein the configuration data includes information for establishing the second computing session; and encapsulating the authentication token and the configuration data in the session transfer key.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
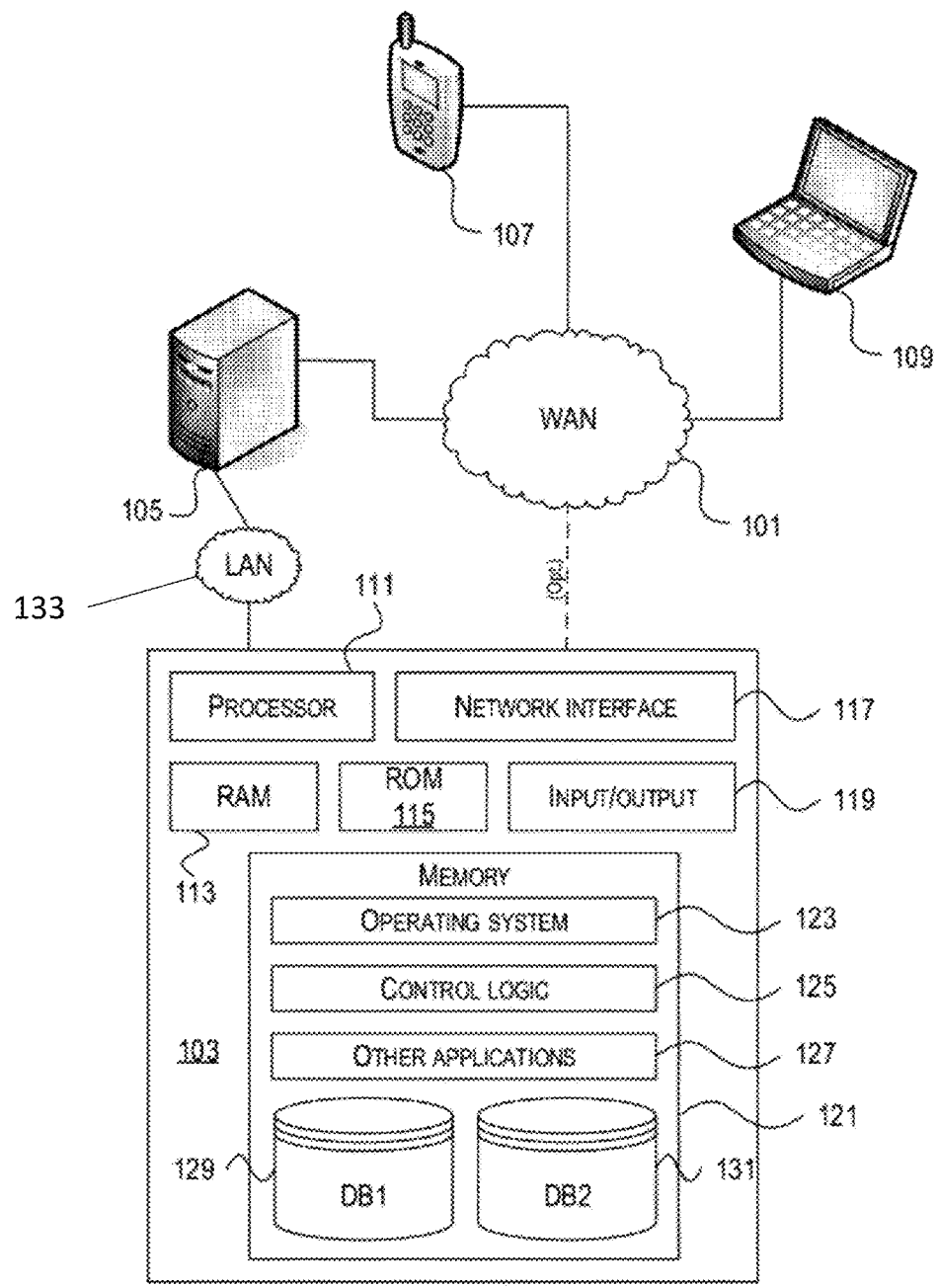
FIG. 1 depicts an illustrative computer system architecture that may be used in accordance with one or more illustrative aspects of the concepts described herein.

In the following description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. Various aspects of the concepts described herein may be implemented in ways not specifically described herein (e.g. other embodiments and processes may be practiced or carried out in ways which differ from the illustrative embodiments and processes described herein).

With respect to current techniques, a user of a client device can establish a first computing session with a VM that hosts a software application (e.g., Microsoft Word). To access the VM hosting the application, the user establishes a first computing session with the VM by providing authentication credentials to a management server. The authentication credentials can include, e.g., a user name and password. Once the user establishes the first computing session, the user may require a document file or other resource stored by a remote storage provider.

To access the document file, the user establishes a second computing session with the remote storage provider from the first computing session. Because the remote storage provider does not have access to the authentication credentials used by the user to establish the first computing session, the remote storage provider requires input of the user's authentication credentials. In conventional systems, users can only establish the second computing session by manually entering their authentication credentials to access the remote storage provider. This is because the authentication credentials are not shared between the VM hosting the software application and the remote storage provider, and the user has not previously established the second computing session with the remote storage provider (i.e. the user has not previously established an authentication session with the storage provider).

As a general introduction to the subject matter described in more detail below, aspects of the concepts described herein are directed towards establishing a second computing session for a second resource from an established first computing session for a first resource without requiring input from a user of a client device. For example, a server can receive a request from a client device to establish the first computing session for the first resource provided by a first resource provider and hosted by a VM. In response to receiving the request, the server can establish a second computing session for a second resource. This may be accomplished, for example, by the server generating a session transfer key for accessing the second resource which may be resident on, accessible through or otherwise provided by a resource provider not associated with the first computing session. The server can further issue instructions to the VM for establishing a second computing session to host the second resource. The server can also provide the instructions to the client device to establish the second computing session. Significantly, the server establishes the second computing session without further input from the user of the client device (i.e. the server autonomously establishes the second computing session).

Advantageously, authentication for the second computing session is achieved without requiring manual input from the user. That is, without the session transfer key, the second resource provider(s) would require the user to manually input the user's authentication information and thereby delaying access to data of the second resource or otherwise diminishing user experience of the system due to duplicative (or multiple) authentication requests. Specifically, the second computing session can be established from the first computing session by utilizing the session transfer key such that resources can be accessed without having to re-authenticate a user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
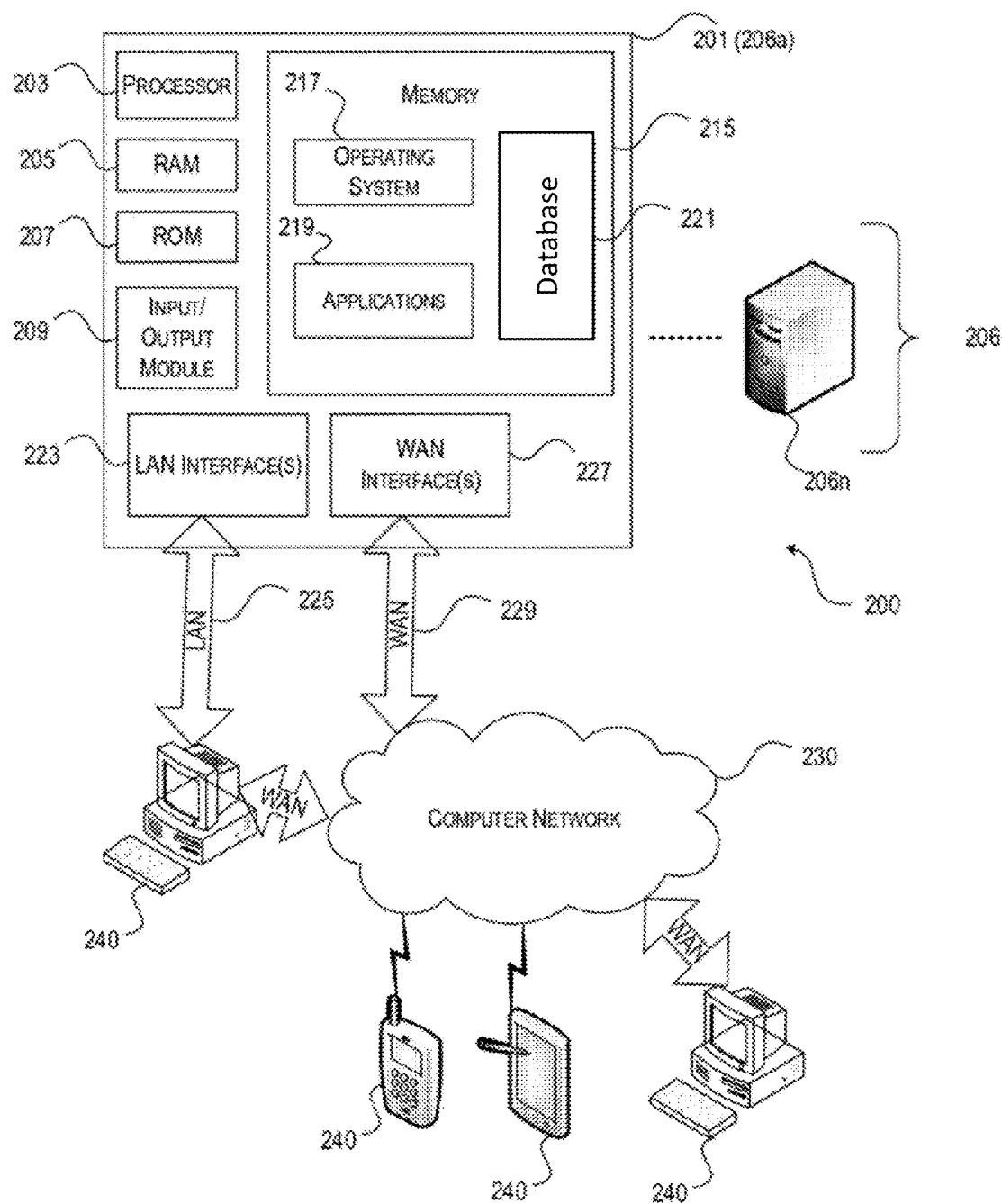
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide VMs for client access devices. The computing device 201 may have a processor 203 for controlling overall operation of the server and its associated components, including RAM 205, ROM 207, input/output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all the elements described above with respect to the data server 103 or computing device 201. The network connections depicted in FIG. 2 include a local area network (LAN) 225 and a wide area network (WAN) 229 but may also include other networks. When used in a LAN networking environment, computing device 201 may be connected to the LAN 225 through an adapter or network interface 223. When used in a WAN networking environment, computing device 201 may include a modem or other wide area network interface 227 for establishing communications over the WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, the computing environment 200 may include a network appliance installed between the server(s) 206 and terminals 240. The network appliance may manage client/server connections, and in some cases can load balance client connections amongst a plurality of back-end servers 206.

The terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240.

In yet another embodiment, a single terminal 240 communicates with a single server 206.

A terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). The server 206, in some embodiments, may be referred to as any one of the following non-exhaustive terms: server(s), local machine; remote machine; server farm(s), or host computing device(s).

In one embodiment, the terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on a server 206 or a hypervisor executing on a terminal 240.

Some embodiments include a terminal 240 that displays application output generated by an application remotely executing on a server 206 or other remotely located machine. In these embodiments, the terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206a-206n logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from a terminal 240, forwards the request to a second server 206b (not shown), and responds to the request generated by the terminal 240 with a response from the second server 206b (not shown). First server 206a may acquire an enumeration of applications available to the terminal 240 as well as address information associated with an application server 206 hosting an application identified within the enumeration of applications. First server 206a can present a response to the client's request using a web interface and communicate directly with the terminal 240 to provide the terminal 240 with access to an identified application. One or more terminals 240 and/or one or more servers 206 may transmit data over network 230, e.g., network 101.

Figure 3:
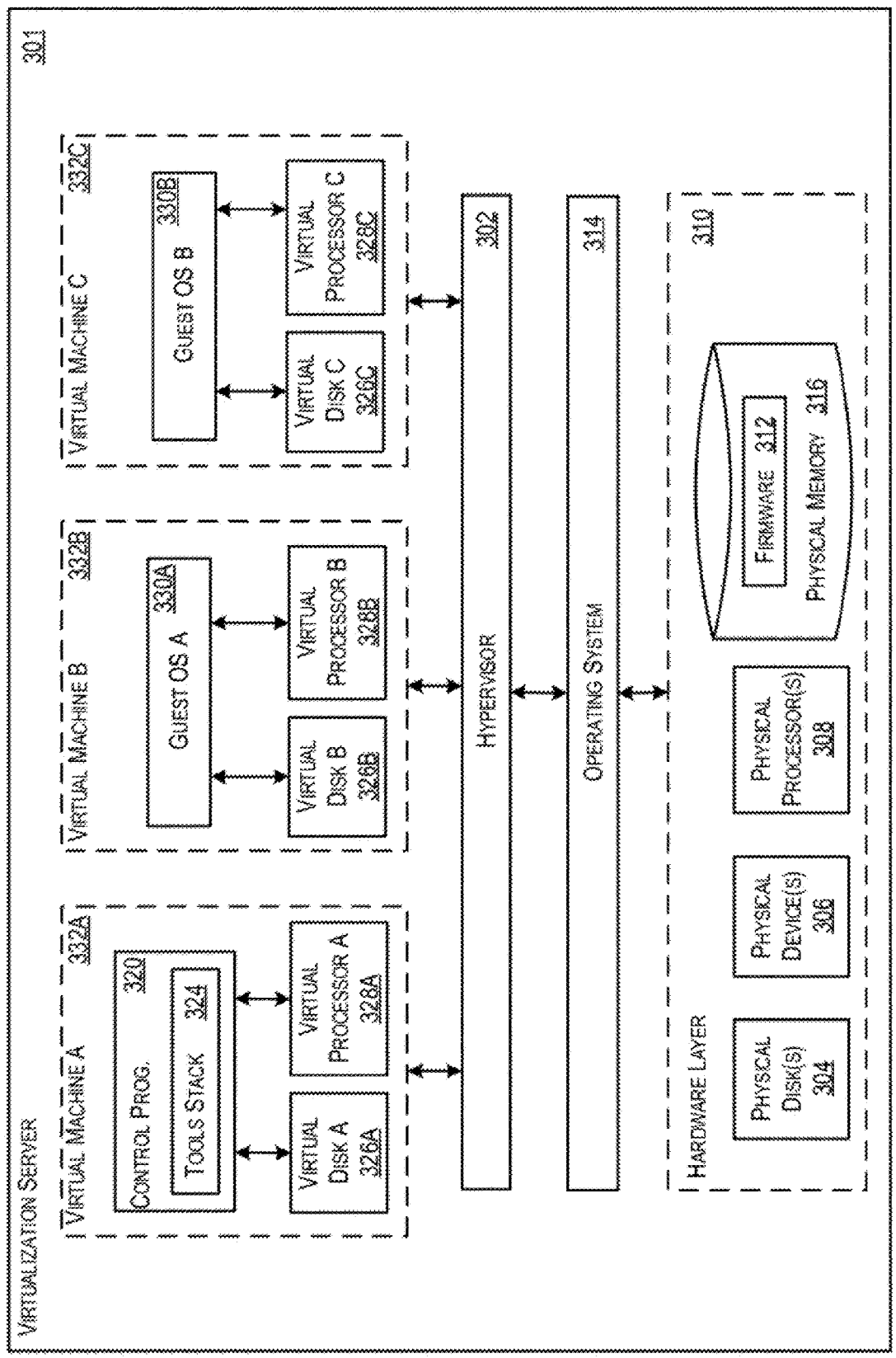
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, Dom0, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine. Hypervisor 302 may be Type 2 hypervisor, where the hypervisor executes within an operating system 314 executing on the virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301 and may include program data stored in the physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute a hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more VMs 332B-C (generally 332) in which guest operating systems 330 execute. In some embodiments, hypervisor 302 may load a VM image to create a VM 332. In other embodiments, the hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by the virtualization server 301 (e.g., any hardware resource available within the hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to the VM 332.

As shown in FIG. 3, virtualization server 301 may host or execute one or more VMs 332. A VM 332 is a set of executable instructions that, when executed by a processor 308, may imitate the operation of a physical computer such that the VM 332 can execute programs and processes much like a physical computing device. While FIG. 3 illustrates an embodiment where a virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to the VMs 332.

Each VM 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each VM 332 with a unique view of the physical disks 304. Thus, in these embodiments, the particular virtual disk 326 included in each VM 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
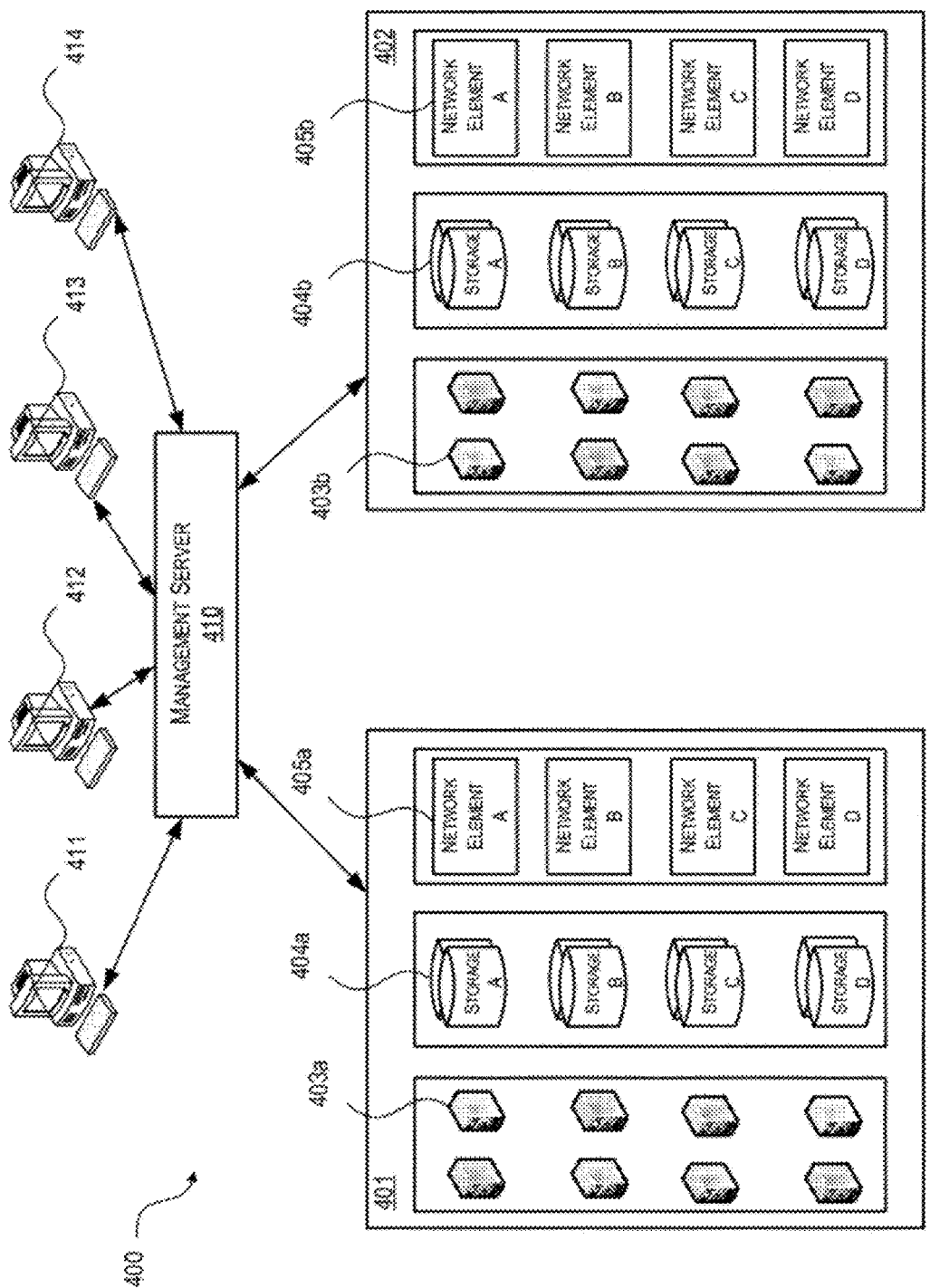
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred to herein as "host servers 403"), storage resources 404a-404b (generally referred to herein as "storage resources 404"), and network resources 405a-405b (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, Mass., among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. The management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in a cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Wash.), AMAZON EC2 (Amazon.com Inc. of Seattle, Wash.), IBM BLUE CLOUD (IBM Corporation of Armonk, N.Y.), or others.

Figure 5:
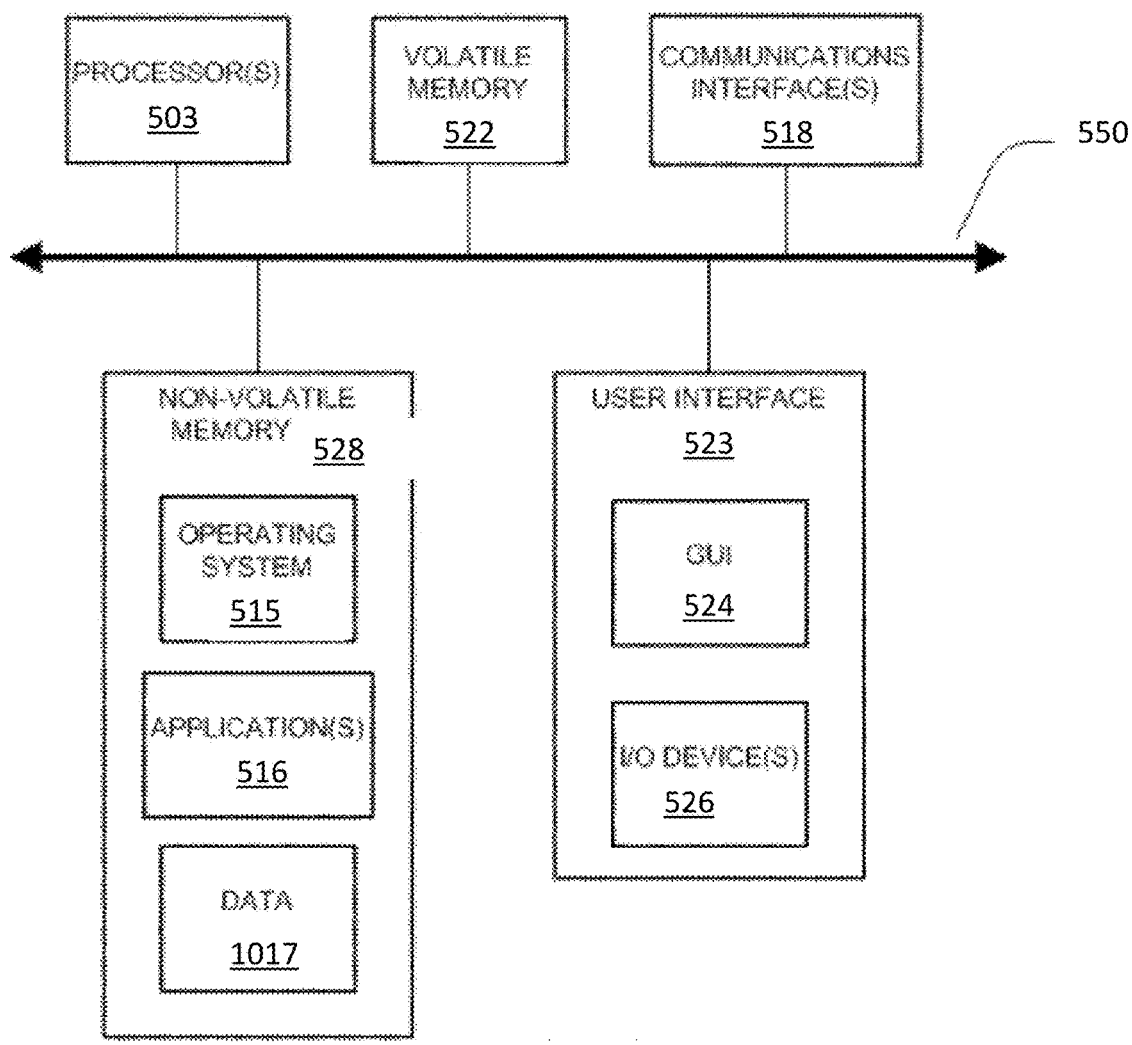
FIG. 5 is a block diagram of an illustrative computing device in accordance with one or more illustrative aspects of the concepts described herein.

As shown in FIG. 5, computer 501 may include one or more processors 503, volatile memory 522 (e.g., RAM), non-volatile memory 528 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 523, one or more communications interfaces 518, and communication bus 550. User interface 523 may include graphical user interface (GUI) 524 (e.g., a touchscreen, a display, etc.) and one or more input/output (I/O) devices 526 (e.g., a mouse, a keyboard, etc.). Non-volatile memory 528 stores operating system 515, one or more applications 516, and data 517 such that, for example, computer instructions of operating system 515 and/or applications 516 are executed by processor(s) 503 out of volatile memory 522. Data may be entered using an input device of GUI 524 or received from I/O device(s) 526. Various elements of computer 501 may communicate via communication bus 550. Computer 501 as shown in FIG. 5 is shown merely as an example of components 105, 107, and 109 of FIG. 1, terminals 240 of FIG. 2, and/or client computers 411-414 of FIG. 4. A skilled artisan understands that components 105, 107, and 109, terminals 240, and/or client computers 411-414 may be implemented by any computing or processing environment and with any type of machine or set of machines that may have suitable hardware and/or software capable of operating as described herein.

Processor(s) 503 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located) processors.

Communications interfaces 518 may include one or more interfaces to enable computer 501 to access a computer network such as a LAN, a WAN, or the Internet through a variety of wired and/or wireless or cellular connections.

In described embodiments, a first computing device 501 may execute an application on behalf of a user of a client computing device (e.g., a client 102), may execute a VM, which provides an execution session within which applications execute on behalf of a user or a client computing device (e.g., any of the client computers 411-414 of FIG. 4), such as a hosted desktop session, may execute a terminal services session to provide a hosted desktop environment, or may provide access to a computing environment including one or more of: one or more applications, one or more desktop applications, and one or more desktop sessions in which one or more applications may execute.

Establishing Computing Sessions from with Virtual Machine (VM) Computing Sessions As stated herein, a VM is a computer software application, which when executed on a processor (e.g., a physical server) emulates the functionality of a physical computer. Their implementations can include specialized hardware and/or software. In one aspect, a VM can provide the functionality needed to execute entire operating systems (e.g., host a virtual desktop computer). In other aspects, a VM can execute computer programs in a platform-independent environment.

With respect to current techniques, a user of a client device can establish a first computing session with a VM that hosts a software application (e.g., Microsoft Word). To access the VM hosting the application, the user establishes a first computing session with the VM by providing authentication credentials to a management server. The authentication credentials can include, e.g., a user name and password. Once the user establishes the first computing session, the user may require a document file or other resource stored by a remote storage provider.

To access the document file, the user establishes a second computing session with the remote storage provider from the first computing session. Because the remote storage provider does not have access to the authentication credentials used by the user to establish the first computing session, the remote storage provider requires input of the user's authentication credentials. In conventional systems, users can only establish the second computing session by manually entering their authentication credentials to access the remote storage provider. For example, the remote storage provider does not know that the user has been authenticated because the user has not previously established an authenticated session with the remote storage provider.

Embodiments of the present disclosure are directed towards establishing a second computing session for a second resource from an established first computing session for a first resource without requiring input from a user of a client device. (i.e., the second computing session is automatically established) as discussed in greater detail herein.

Advantageously, authentication for the second computing session is achieved without requiring manual input from the user. That is, without the session transfer key, the second resource provider(s) would require the user to manually input the user's authentication information and thereby delaying access to data of the second resource or otherwise diminishing user experience of the system due to duplicative (or multiple) authentication requests. Specifically, the second computing session can be established from the first computing session by utilizing the session transfer key such that resources can be accessed without having to re-authenticate a user.

Figure 6:
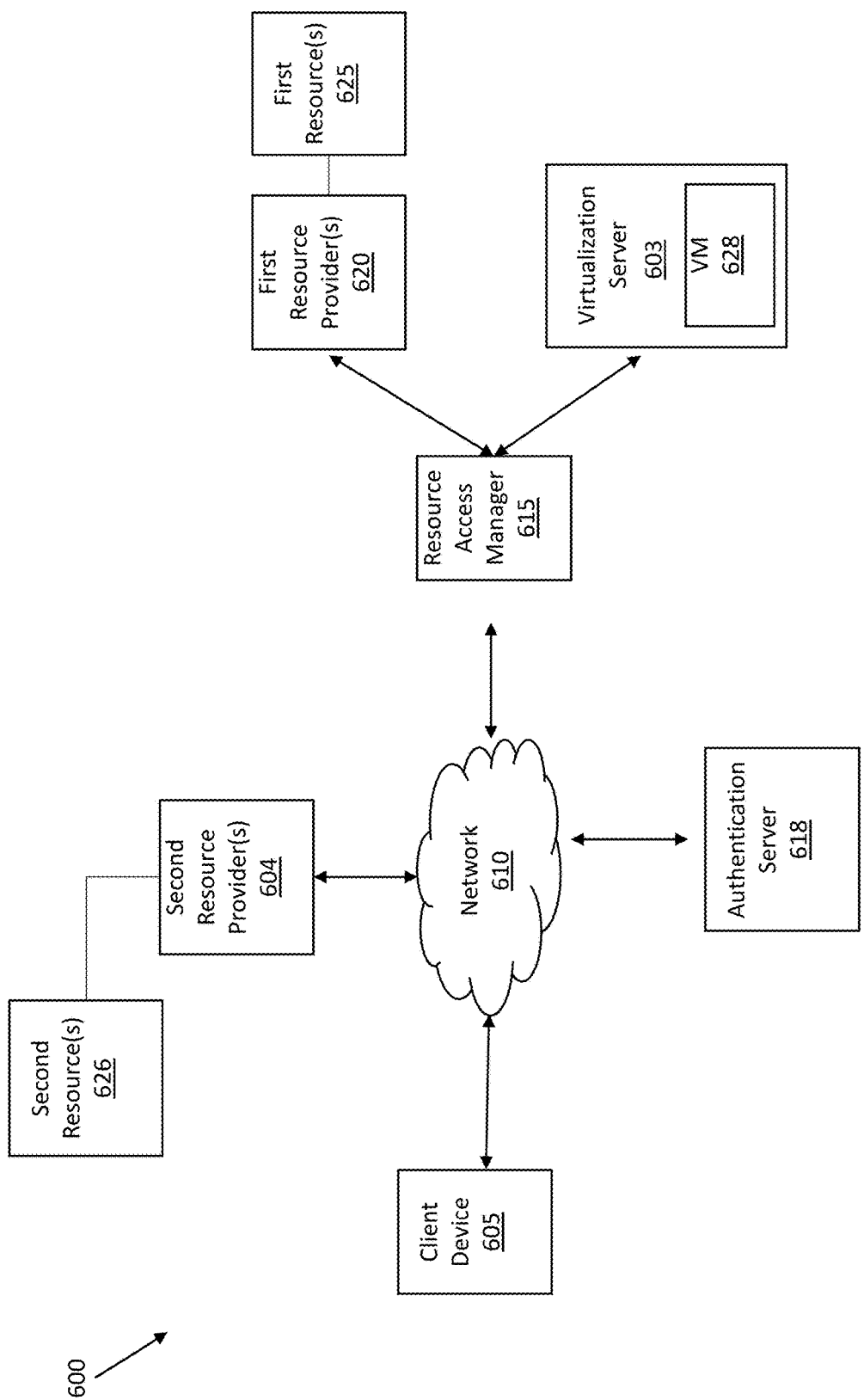
FIG. 6 depicts an illustrative operating environment that may be used in accordance with one or more illustrative aspects of the concepts described herein.

Regarding FIG. 6, a computing environment 600 includes a client device 605 communicatively coupled to servers 604, 615, 618 via network 610. In an embodiment, the client device 605 can establish a computing session with a VM 628 (e.g., such as a VM 332 of FIG. 3) executed by a virtualization server 603 (e.g., such as virtualization server 301 of FIG. 3). The server 615 (also referred to herein as a resource access manager) provides an interface for a user of the client device 605 to access one or more resources (e.g., first resource(s) 625). Resources include but are not limited to software applications ("apps"), virtual desktops, documents, files, networks, servers, storage, and services such as software as a service (SaaS), to provide a few examples. The computing environment 600 can be a cloud computing environment (e.g., such as cloud system 400 of FIG. 4) and client device 605 can be configured to operate substantially similar to terminals 240 of FIG. 2 or client computers 411-414 of FIG. 4. The network 610 can be substantially similar to networks 101, 230 of FIGS. 1-2, respectively.

In embodiments, the resource access manager 615 can receive a request for a first resource 625 from a client device 605. The request can include a user's authentication credentials (e.g., user name and password) and a resource identifier of the first resource 625. In an embodiment, the resource identifier can be a string of unique alphanumeric characters, or any other unique code, that can identify a specific resource. For example, the alphanumeric string "A001" can identify an application, e.g., Microsoft Word stored by a resource provider (e.g., first resource provider 620). The resource access manager 615 can authenticate the user's access to the first resource by sending the authentication credentials and the resource identifier to an authentication server 618. The authentication server 618 can verify the user's authentication credentials and perform a look-up of, e.g., a look-up table, database or other structure that identifies one or more resources each user is authorized to access. For example, the authentication server 618 can determine if the resource identifier of the first resource 625 is listed in the look-up table of the one or more resources the user is authorized to access. In response to finding the resource identifier of the requested resource in the look-up table, the authentication server 618 can provide the resource access manager 615 with an authentication token that enables the user to access the first resource 625 as discussed in greater detail herein.

In some examples, an administrator, e.g., an IT manager of a company, can register users with the authentication server 618 and enable each user's access to the one or more resources. For example, with respect to each user, the administrator can insert resource identifiers in the look-up table of the resources that each user is authorized to access.

The resource access manager 615 can provide the virtualization server 603 with the authentication token and the resource identifier. Using the resource identifier, the virtualization server 603 can provision (e.g., allocate hardware and/or software computing resources needed to execute the first resource) the VM 628 to host the first resource 625. In embodiments, the virtualization server 603 can include a hypervisor (e.g., the hypervisor 302 of FIG. 3) that allocates the hardware computing resources included in a hardware layer (e.g., hardware layer 310 of FIG. 3) of the virtualization server 603 needed to execute the first resource 625.

The VM 628 can provide the first resource provider 620 with the authentication token to access the first resource 625. In embodiments, the first resource provider 620 is configured to manage access to the first resource 625. For example, a company may only have limited licenses available for a particular app. Accordingly, if a user, who is authorized to access the app, has requested access after all the licenses for the app are being used by other users, the first resource provider 620 notifies the VM 628 and prevents the user from accessing the app until a license has been released.

In response to receiving the client-device request for the first resource 625, the resource access manager 615 receives or otherwise determines information related to or identifying one or more possible second resources 626 to which the user may require access. That is, based upon the client-device request for the first resource, the resource access manager 615 receives (directly or indirectly), derives or otherwise determines information identifying one or more possible second resources 626 to which the user may require access.

In one example, the client-device request can include information (explicitly or implicitly) identifying the second resource 626. In another example, in response to receiving a client-device request, the resource access manager 615 issues a request to the authentication server 618 to identify all resources the user is authorized to access. The authentication server 618 provides the resource access manager 615 with a list identifying the resources.

In yet another example, the resource access manager 615 determines that the user may require access to one or more of the resources on the list based upon the first requested resource. The resource access manager 615 can include a table that identifies relationships between resources (e.g., Microsoft Word may require access to a remote storage). Based on the table, the resource access manager 615 determines the second resources 626 to which the user may require access. In still another example, the resource access manager 615 can assume that user may require access to any or all the resources on the list.

In response to determining the second resource(s) 626 to which the user may require access, the resource access manager 615 obtains an authentication token from the authentication server 618 for the determined second resource(s) (i.e. token-based authentication is used). In an example embodiment, an authentication token may be provided for each resource. It should be noted that in some embodiments, each resource may need its own token, while in other embodiments, this may not be true. For example, a first authentication token may be provided for a first resource and a second authentication token may be provided for a second resource. In some such embodiments, resources provided by the same resource provider may be provided authentication tokens of the same token type. For example, assuming that the first and second resources are provided by the same resource provider the first authentication token and the second authentication token may be the same type of authentication token (i.e. resources coming from the same provider may utilize the same type of token).

The resource access manager 615 provides the authentication token to second resource provider(s) 604 configured to manage access to the determined second resource(s) 626. In embodiments, the resource access manager 615 also provides the second resource provider(s) 604 with a session identifier corresponding to the computing session with the VM 628 configured to host the first resource. In embodiments, the session identifier is an n-bit number that identifies a specific computing session (e.g., ID 1 and ID 2 identify two different computing sessions). In response, the second resource provider(s) 604 provide the resource access manager 615 with second resource token(s).

Figure 9:
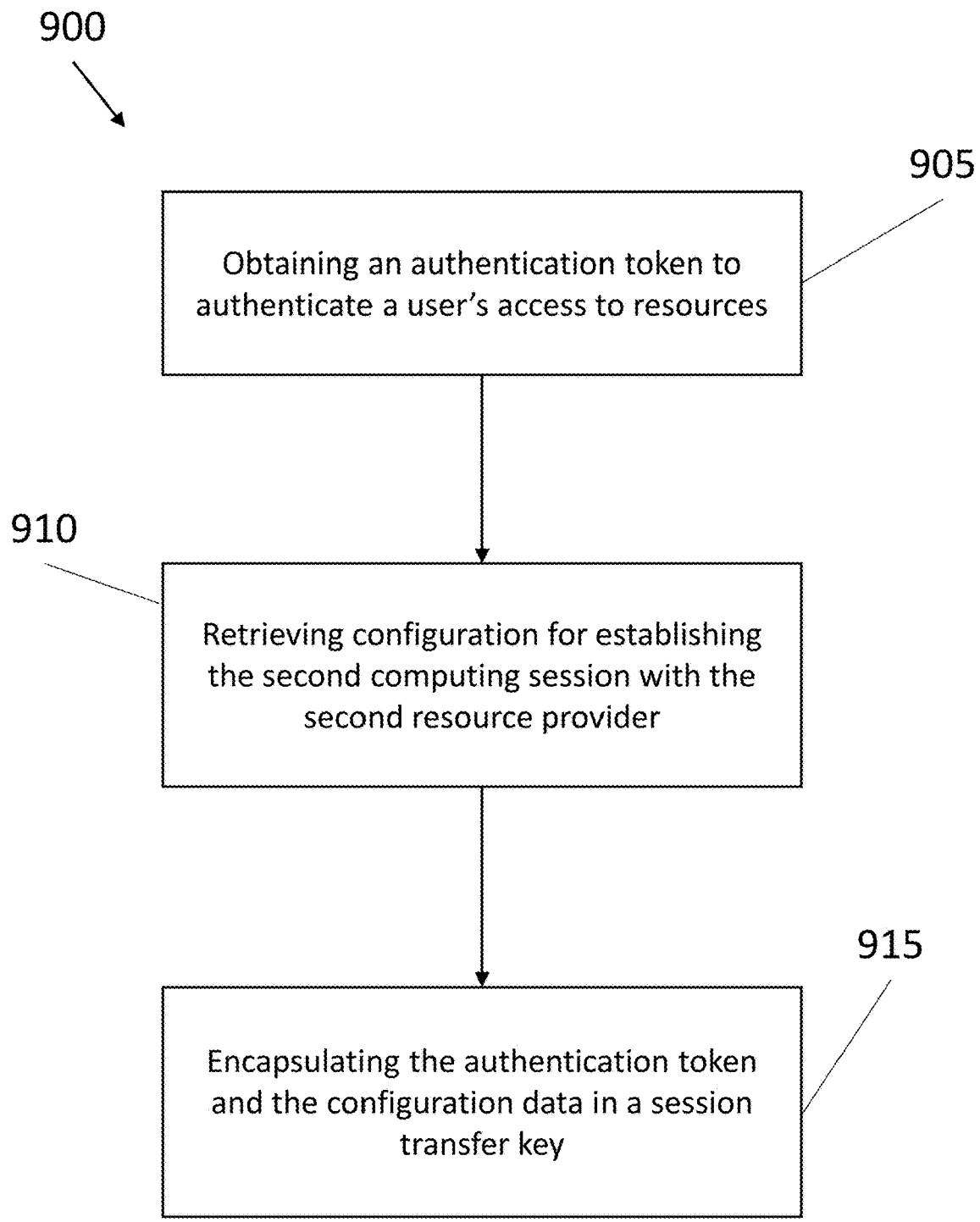
FIG. 9 is a flow diagram of an illustrative method for generating a session transfer key in accordance with one or more illustrative aspects of the concepts described herein.

Using the authentication token for the first resource 625 and the second resource token(s), the resource access manager 615 generates a session transfer key using a technique such as the one described in FIG. 9. The session transfer key combines the tokens to enable the user to access the first and second resources 625, 626 from the computing session with the VM 628.

In embodiments, the second resource provider(s) 604 are remote from the first resource provider(s) 620. In embodiments, the second computing session can be a web-session or a windows session. In order to establish the second computing session, the second resource provider(s) 604 need to authenticate the user that is accessing the VM 628. Accordingly, the VM 628 provides the session transfer key to the second resource provider(s) 604 to authenticate the user. In this way, authentication for the second computing session is achieved without requiring manual input from the user. That is, without the session transfer key, the second resource provider(s) 604 would require the user to manually input the user's authentication information and thereby delaying access to data of the second resource or otherwise diminishing user experience of the system due to duplicative (or multiple) authentication requests. That is, the session transfer key the second computing session can utilize the session transfer such that resources can be accessed without having to re-authenticate a user.

Figure 7A:
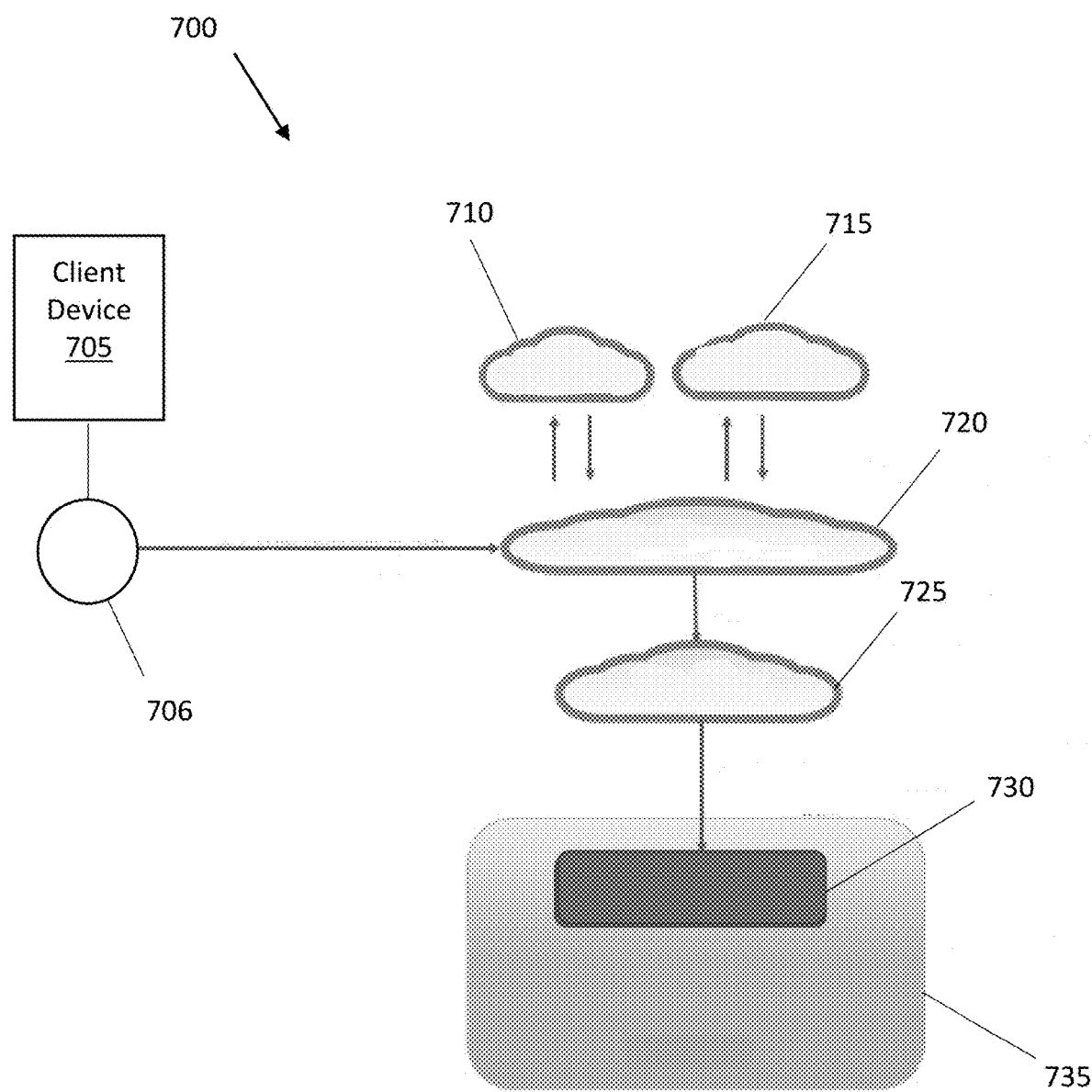
FIG. 7A depicts example communication flows in an illustrative operating environment that may be used in accordance with one or more illustrative aspects of the concepts described herein.

Regarding FIG. 7A, a computing environment 700 (e.g., such as computing environments 200, 400, 600 of FIGS. 2, 4, & 6, respectively) includes a client device 705, which can be substantially similar to the client device 605 of FIG. 6. The client device 705 includes a remote access client 706 that includes one or more protocols that enable the client device 705 to establish a computing session with a VM 735 that executes one or more resources. In embodiments, the one or more resources are hosted by a remote resource server 725. Accordingly, the one or more protocols of the remote access client 706 are configured to pass information (e.g., user keyboard and/or mouse inputs, screenshot updates, and graphical data for a high definition user experience) between the client device 705 and the remote resources server 725. The remote access client 706 can further include a UI (not shown) that enables a user of the client device 705 to issue a request for the one or more resources. For example, the UI can present a user with graphical representations of the one or more resources that a user can select using a touch screen or any other input device (e.g., mouse or keyboard) of the client device 705.

In response to the user selecting a resource, the remote access client 706 issues a request to a resource access server 720 which can be substantially similar to the resource access manager 615 of FIG. 6. The request can include the user's authentication credentials (e.g., user name and password), a resource identifier of the resource, and a session identifier of the computing session for the requested resource. The resource access server 720 can authenticate the user's access to the resource by sending the authentication credentials and the resource identifier to an authentication server 710 which can be substantially similar to the authentication server 618 of FIG. 6. The authentication server 710 can verify the user's authentication credentials and perform a look-up of, e.g., a look-up table or a database that identifies one or more resources that the user is authorized to access. In response to finding a match between the requesting user and the selected resource in the look-up table, the authentication server 710 can provide the resource access server 720 with an authentication token that enables the user to access the resource.

In response to receiving the request for the first resource, the resource access server 720 can determine that the user may require access to one or more second resources using one or more of the techniques described with respect to FIG. 6. The resource access server 720 obtains an authentication token from the authentication server 710 for the second resource. The resource access server 720 provides the authentication token and the session identifier for the first resource to a second resource server 715 configured to manage access to the second resource. The second resource server 715 provides the resource access server 720 with a token for the second resource. Using the authentication token for the requested resource and the second resource token, the resource access server 720 generates a session transfer key.

The remote resource server 725 receives the session transfer key from the resource access server 720 and maps the session transfer key to the session identifier of the computing session between the client device 705 and the VM 735. For example, the remote resource server can generate a table that can include at least two columns and a plurality of rows. A first column can include session identifiers, and a second column can include corresponding session transfer keys. Thus, a session identifier in a first row, first column corresponds to a session transfer key in the first row, first column. A VM controller 730 stores the map of the session transfer key and the session identifier for access by the VM 735 as discussed in greater detail with respect to FIG. 7B. In embodiments, the VM controller 730 may be a component of the VM 735, and configured for facilitating communication with the resource access server 720.

Figure 7B:
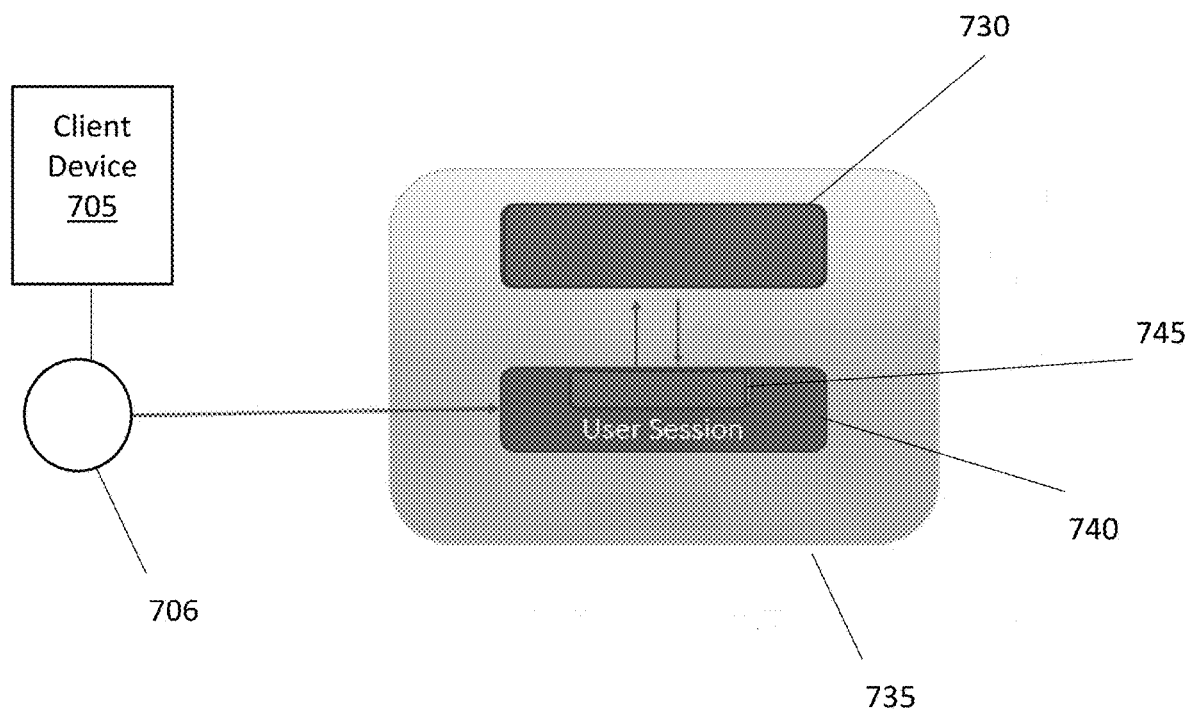
FIG. 7B depicts example communication flows within a virtual machine (VM) that may be used in accordance with one or more illustrative aspects of the concepts described herein.

Regarding FIG. 7B, the client device 705 initiates a computing session 740 with the VM 735 by selecting the first resource on a UI presented to the user by the remote access client 706. In response to the initiation of the computing session 740, the VM 735 establishes another computing session with the second resource server 710 for the second resource. In an embodiment, the VM 735 includes a resources plug-in 745 configured to issue a request to the VM controller 730 for the session transfer key. For example, the request can include the session identifier and a file-path of a memory location in which session transfer keys are stored by the VM controller 730. In response, the VM controller 730 performs a look-up of a map of session identifiers and session transfer keys to retrieve the appropriate session transfer key. Using the session transfer key, the VM 735 establishes the second computing session with the second resource server 715 for the second resource without requiring user input as described in FIG. 8.

Figure 8:
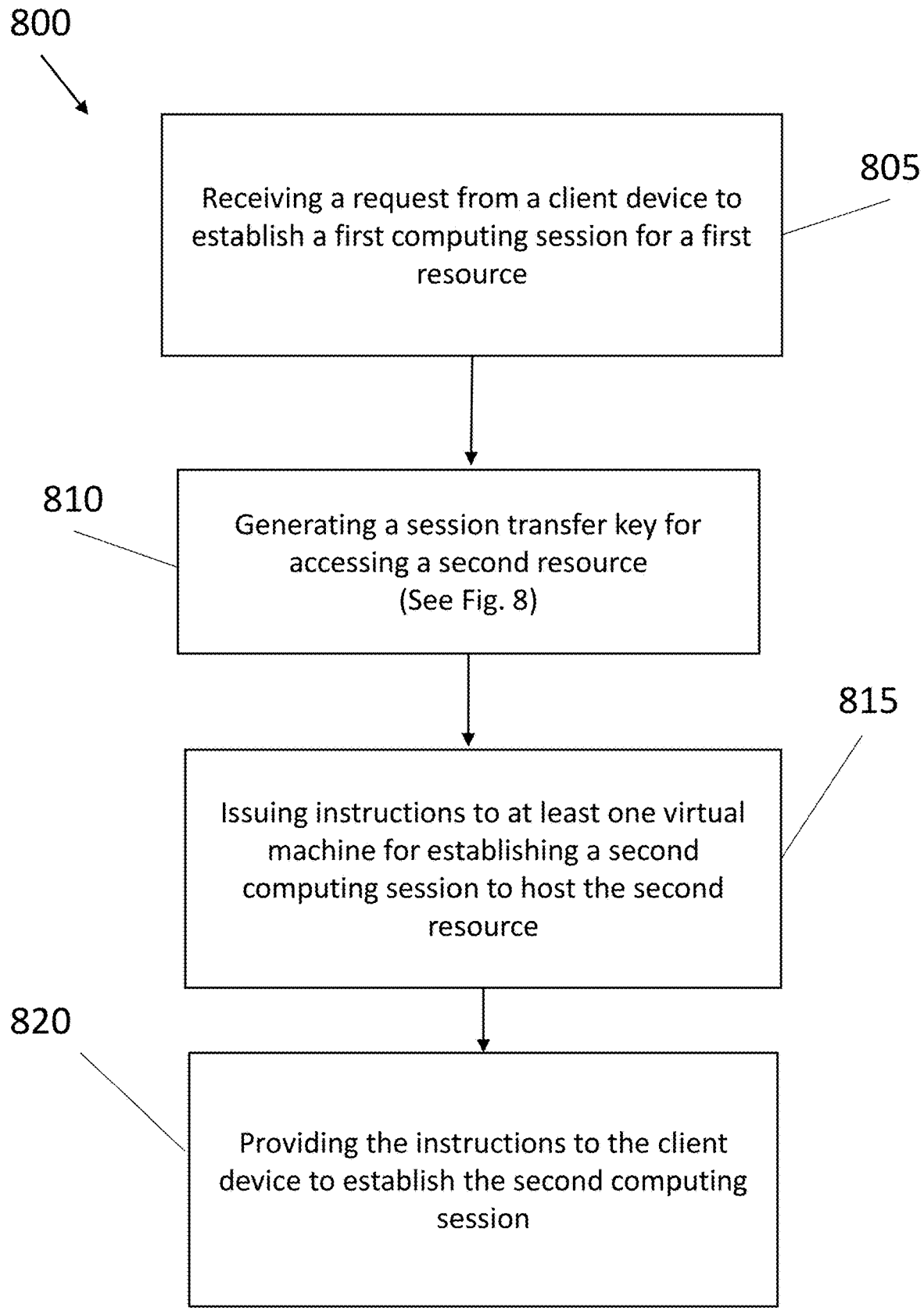
FIG. 8 is a flow diagram of an illustrative method for sharing configuration information between computing sessions in accordance with one or more illustrative aspects of the concepts described herein.

Regarding FIG. 8, a method 800, at 805, includes receiving, by a server (e.g., resource access manager 615 or resource access server 720 of FIGS. 6 & 7A-B, respectively), a request from a client device (e.g., client devices 605, 705 of FIGS. 6 & 7A-B, respectively) to establish a first computing session for a first resource (e.g., first resource 625 of FIG. 6). In embodiments, the first computing session hosts the first resource on at least one VM (e.g., the VM 735 of FIGS. 7A-B). The first resource can be associated with a user of the client device and provided by a first resource provider. For example, the first resource is one that the user is authorized to access and/or has requested to access.

At 810, the method 800 also includes generating, by the server, a session transfer key for accessing a second resource provided by a second resource provider (e.g., the second resource 626 and the second resource provider 604 of FIG. 6). Generating the session transfer key can include determining, by the server, that a user of the client device may require access to the second resource as described in greater detail with respect to FIGS. 6 & 7A. Further, the method 800, at 815, includes issuing, by the server, instructions to the client device for establishing the second computing session to the second resource without requiring manual input for the second resource from the user of the client device. In embodiments, the instructions include a mapping of the session transfer key and the session identifier. In some embodiments, the server can be a single server that include the functionalities servers 620, 625 of FIG. 6.

Additionally, the method 800, at 820, includes providing, by the server, the instructions to the client device for establishing the second computing session to access the second resource without requiring input (e.g., a user selection gesture, such as a tap, swipe, pinch, or flick gesture, performed on a graphical user interface of the client device) from the user of the client device. In embodiments, establishment of the second computing session can be based on the mapping of the session transfer key to the session identifier. The second computing session can be between the at least one VM and the second resource provider for the second resource. Further, the second computing session can be a windows or web session within a browser of the client device and established using the mapping of the session transfer key to the session identifier.

Regarding FIG. 9, a method 900, at 905, includes obtaining, by a server (e.g., resource access manager 615 or resource access server 720 of FIGS. 6 & 7A-B, respectively), an authentication token from an authentication server (e.g., servers 618, 710 of FIGS. 6 & 7A, respectively). The authentication token can be configured to authenticate a user's access to the second resource. In embodiments, obtaining the authentication token includes determining, by the server, the second resource for the client device. Determining the second resource for the client device can include querying, by the server, an authentication server for resources the user of the client device is authorized to access.

The method 900, at 910, also includes retrieving, by the server, configuration data from a second resource provider (e.g., the second resource provider 604 of FIG. 6). The configuration data can include information for establishing the second computing session with the second resource provider. For example, the configuration data can include information, such as URLs, IP addresses, hostnames, connection strings, account IDs, and/or timestamps, to provide a few examples, for interfacing with the second resource provider.

At 915, the method 900 includes encapsulating, by the server, the authentication token and the configuration data in the session transfer key. In an example use case, the configuration data may include information the application on the remote server needs to connect and authenticate.

Figure 10:
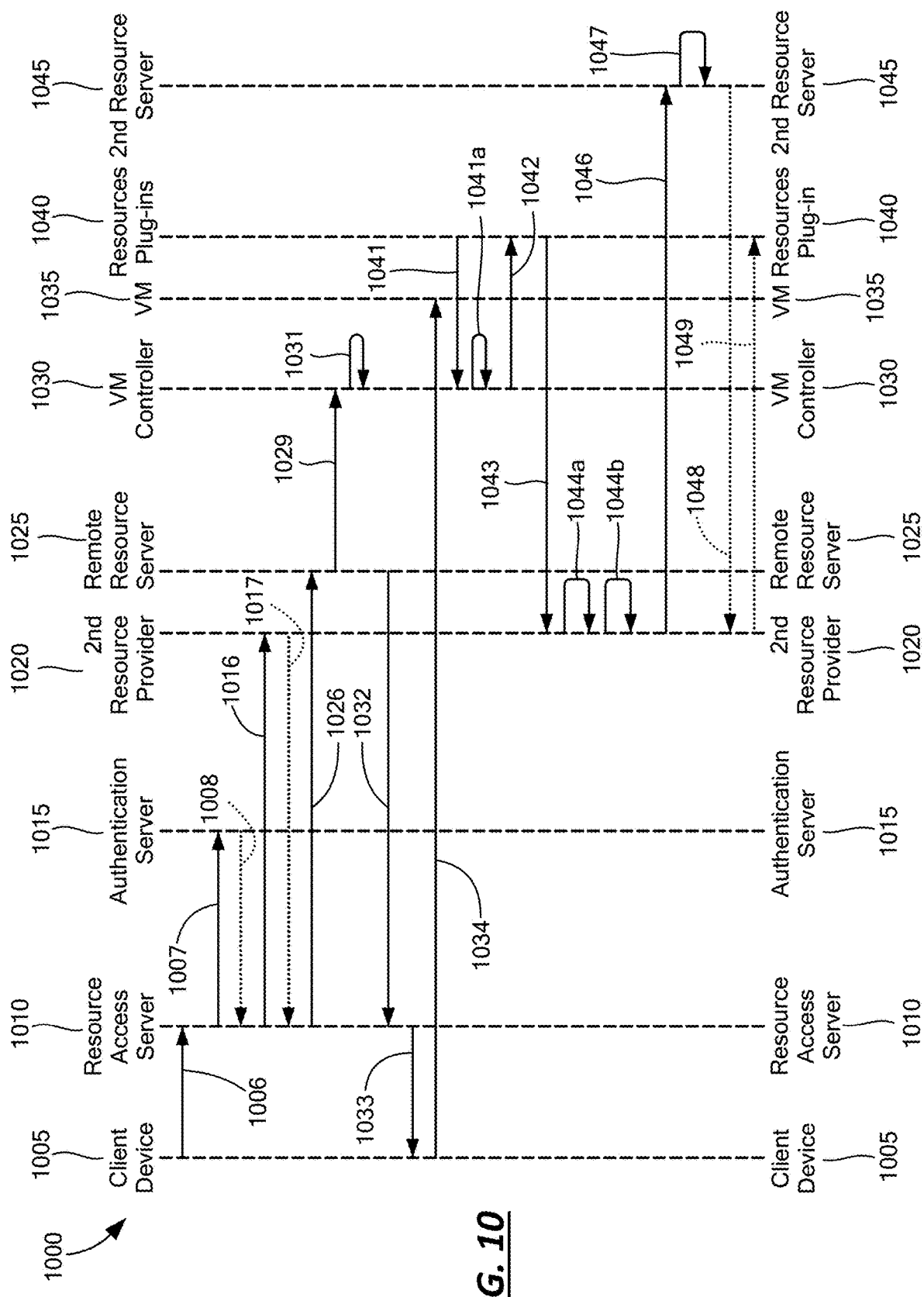
FIG. 10 is an illustrative process flow for establishing a second computing session from a first computing session without user input in accordance with one or more illustrative aspects of the concepts described herein.

Regarding FIG. 10, an example process flow 1000 for establishing a second computing session from a first computing session without user input begins with a user of a client device 1005 (e.g., such as client devices 605, 705 of FIGS. 6 & 7A-B, respectively) issuing a request 1006 for a first resource such as a software application (e.g., AutoCad or Microsoft Word) to a resource access server 1010. The resource access server 1010 can determine that the user may require access to one or more second resources using one or more of the techniques described above in conjunction with FIG. 6, for example. In an embodiment, the resource access server 1010 can determine user intent to edit or otherwise seek access to a file (e.g., a second resource) stored by a remote storage provider such as ShareFile® (e.g., second resource provider 1020). Once the determination is made, the resource access server 1010 requests and obtains 1007, 1008 an authentication token from an authentication server 1015.

Using the authentication token, the resource access server 1010 generates a session transfer key 1016 (e.g., a "ShareFileSSOHandle"). For example, the resource access server 1010 provides the authentication token to the second resource provider 1020. The second resource provider 1020 stores the authentication token and provides a session transfer key 1017 to the resource access server 1010. The session transfer key can be a cryptographically-secure random number that is used as a key to retrieve data (e.g., the authentication token) stored by the second resource provider 1020. The resource access server 1010 provides the session transfer key to a remote resource server 1025 (e.g., such as servers 615, 720 of FIGS. 6 & 7A) along with a request 1026 for the first resource. The remote resource server 1025 assigns a session identifier (ID) to a computing session for the first server and provides the session transfer key and the session ID 1029 to a VM controller 1030 (e.g., such as VM controller 730 of FIGS. 7A-B). The VM controller 1030 maps the session ID to the session transfer key and stores the map and the session transfer key 1031 in memory.

Subsequently, the remote resource server 1025 sends a launch ticket 1032 that includes information for accessing the first and second resources (e.g., resource identifiers and a file-path of the document file stored by ShareFile) to the resource access server 1010. Using the launch ticket, the resource access server 1010 generates a file such as a connection description file that includes instructions for establishing the computing session for the first resource and the information for accessing the second resource and provides the file 1033 to the client device 1005. In embodiments, the file can be an independent computer architecture (ICA) file including such instructions for establishing the computing session according to Citrix's ICA protocol as discussed above in FIG. 2.

In response to receiving the file, the client device 1005 establishes the computing session 1034 with the VM 1035 for the first resource (e.g. the client device may utilize information from an ICA file and launch ticket in establishing the computing session).

The VM 1035 includes a resources plug-in 1040 that is configured to communicate with the second resource provider 1020. In response to receiving the information for accessing the second resource, the resources plug-in 1040 issues a request 1041 for the session transfer key from the VM controller 1030. The VM controller 1030 extracts the session ID from the request, validates 1041*a* that it is for the same session and, using the previously stored map, sends 1042 the session transfer key to the resources plug-in 1040. The VM 1035 via the plug-in 1040 issues a request 1043 to the second resource provider 1020 to establish a session for the second resource. The request 1043 includes the session transfer key and a resource identifier corresponding to the second resource being requested by the VM 1035.

In response to receiving the session transfer key from the plug-in 1040, the second resource provider 1020 maps the resource to the token 1044*a* and validates 1044*b* the VM's 1035 access to the second resource. In embodiments, the second resource provider 1020 converts a first token that is trusted by it from the authentication server to a second token that the resource plug-in can use to access resources that have established trust using tokens of the same type as the second token.

Once the VM's 1035 access is validated, the second resource provider 1020 issues a request 1046 for the second resource to a second resource server 1045 on which the second resource resides. In embodiments, request 1046 is authorized through trusted client credentials. Thus, the issued request 1046 can include authentication credentials for the second resource, which the second resource server 1045 processes 1047 e.g. to validate the authentication credentials for the second resource. In process 1047 the second resource server 1045 may, for example, map the user, perform the validation and create an authorization token for the second resource. The second resource server 1045 issues a token 1048 to the second resource provider 1020, which passes the token 1049 it to the VM 1035 via the plug-in 1040. In embodiments, the VM 1035, using the token, can send read, write, and edit operations to the second resource server 1045 to update the file stored by the second resource server 1045 based on the user's interaction with the first resource being hosted by the VM 1035.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the embodiments described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
receiving, by a server, a request from a client device to establish a first computing session for a first resource, wherein the first computing session hosts the first resource on at least one virtual machine (VM), and the first resource is associated with a user of the client device and provided by a first resource provider;
generating, by the server, a session transfer key for accessing a second resource provided by a second resource provider, the second resource associated with the user of the client device, wherein the second resource provider is different than the first resource provider;
issuing, by the server, instructions, to the at least one VM that hosts the first resource, for establishing a second computing session to host the second resource, the instructions including a mapping of the session transfer key to a session identifier; and
providing, by the server, the instructions to the client device to establish the second computing session for the second resource without input for the second resource from the user of the client device, the establishment of the second computing session being between the at least one VM and the second resource provider and based on the mapping of the session transfer key to the session identifier.

2. The method of claim 1 wherein generating the session transfer key includes determining, by the server, the second resource for the client device.

3. The method of claim 2, wherein determining the second resource for the client device includes querying, by the server, an authentication server for resources the user of the client device is authorized to access.

4. The method of claim 1, wherein generating the session transfer key includes:
obtaining, by the server, an authentication token from an authentication server, wherein the authentication token authenticates access of the user of the client device to the second resource;
retrieving, by the server, configuration data from the second resource provider, wherein the configuration data includes information for establishing the second computing session; and
encapsulating, by the server, the authentication token and the configuration data in the session transfer key.

5. The method of claim 4, wherein the configuration data includes information for interfacing with a resource provider associated with the second resource.

6. The method of claim 5, further comprising:
generating, by the server, an independent computing architecture (ICA) file for transmitting the instructions to the client device for establishing the second computing session from the at least one VM, wherein the client device uses the ICA file to establish the first computing session.

7. The method of claim 6, further comprising embedding, by the server, the session transfer key within the ICA file such that the at least one VM is provided with the session transfer key in response to the first computing session being established.

8. The method of claim 6, wherein the ICA file includes an address and port of the at least one VM.

9. The method of claim 1, wherein the session transfer key authenticates access to the second resource by the user.

10. A server comprising:
a memory; and
one or more processors coupled to the memory, the one or more processors configured to:
receive a request from a client device to establish a first computing session for a first resource, wherein the first computing session hosts the first resource on at least one virtual machine (VM), and the first resource is associated with a user of the client device and provided by a first resource provider;
generate a session transfer key for accessing a second resource provided by a second resource provider, the second resource associated with the user of the client device, wherein the second resource provider is different than the first resource provider;
issue instructions, to the at least one VM that hosts the first resource, for establishing a second computing session to host the second resource, the instructions including a mapping of the session transfer key to a session identifier; and
provide the instructions to the client device to establish the second computing session for the second resource without input from the user of the client device for the second resource, the establishment of the second computing session being between the at least one VM and the second resource provider and based on the mapping of the session transfer key to the session identifier.

11. The server of claim 10, wherein the one or more processors are further configured to generate the session transfer key by determining a second resource for the client device.

12. The server of claim 11, wherein the one or more processors are further configured to determine the second resource by querying an authentication server for resources the user of the client device is authorized to access.

13. The server of claim 10, wherein the one or more processors are further configured to generate the session transfer key by:
obtaining an authentication token from an authentication server, wherein the authentication token authenticates access of the user of the client device to the second resource;
retrieving configuration data from the second resource provider, wherein the configuration data includes information for establishing the second computing session; and
encapsulating the authentication token and the configuration data in the session transfer key.

14. The server of claim 13, wherein the configuration data includes information for interfacing with a resource provider associated with the second resource.

15. The server of claim 14, wherein the one or more processors are further configured to generate an independent computing architecture (ICA) file for transmitting the instructions to the client device for establishing the second computing session from the at least one VM, wherein the client device uses the ICA file to establish the first computing session.

16. The server of claim 15, wherein the one or more processors are further configured to embed the session transfer key within the ICA file such that the at least one VM is provided with the session transfer key in response to the first computing session being established.

17. The server of claim 16, wherein the ICA file includes an address and port of the at least one VM.

18. The server of claim 10, wherein the session transfer key is configured to authenticate access to the second resource by the user.

19. A non-transitory computer-readable medium comprising computer-executable instructions, which when executed by one or more processors, cause the one or more processors to:

receive a request from a client device to establish a first computing session for a first resource, wherein the first computing session hosts the first resource on at least one virtual machine (VM), and the first resource is associated with a user of the client device and provided by a first resource provider;

generate a session transfer key for accessing a second resource provided by a second resource provider, the second resource associated with the user of the client device, wherein the second resource provider is different than the first resource provider;

issue instructions, to the at least one VM that hosts the first resource, for establishing a second computing session to host the second resource, the instructions including a mapping of the session transfer key to a session identifier; and provide the instructions to the client device to establish the second computing session for the second resource without input from the user of the client device for the second resource, the establishment of the second computing session being between the at least one VM and the second resource provider and based on the mapping of the session transfer key to the session identifier.

20. The non-transitory computer-readable medium of claim 19, further comprising computer-executable instructions that, when executed, cause the one or more processors to generate the session transfer key by:

obtaining an authentication token from an authentication server, wherein the authentication token authenticates access of the user of the client device to the second resource;

retrieving configuration data from the second resource provider, wherein the configuration data includes information for establishing the second computing session; and encapsulating the authentication token and the configuration data in the session transfer key.

\* \* \* \* \*